United States Patent
Fukuda

(10) Patent No.: US 8,667,433 B2
(45) Date of Patent: Mar. 4, 2014

(54) POLISHING ESTIMATION/EVALUATION DEVICE, OVERPOLISHING CONDITION CALCULATION DEVICE, AND COMPUTER-READABLE NON-TRANSITORY MEDIUM THEREOF

(75) Inventor: Daisuke Fukuda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/593,558

(22) Filed: Aug. 24, 2012

(65) Prior Publication Data

US 2012/0323526 A1 Dec. 20, 2012

Related U.S. Application Data

(62) Division of application No. 13/019,778, filed on Feb. 2, 2011, now Pat. No. 8,499,259.

(30) Foreign Application Priority Data

Feb. 9, 2010 (JP) ................................ 2010-026352

(51) Int. Cl.
*G06F 17/50* (2006.01)

(52) U.S. Cl.
USPC .......................................................... 716/55

(58) Field of Classification Search
USPC .......................................................... 716/55
See application file for complete search history.

(56) References Cited

U.S. PATENT DOCUMENTS

| | | | |
|---|---|---|---|
| 5,948,573 A | 9/1999 | Takahashi | |
| 6,583,027 B2 | 6/2003 | Ota et al. | |
| 6,854,095 B2 | 2/2005 | Idani | |
| 7,013,446 B2 | 3/2006 | Ohba et al. | |
| 7,250,644 B2 | 7/2007 | Idani | |
| 7,448,014 B2 | 11/2008 | Lavin et al. | |
| 8,152,595 B2 * | 4/2012 | Schlicker et al. | 451/5 |
| 2005/0005525 A1 * | 1/2005 | Li et al. | 51/298 |

(Continued)

FOREIGN PATENT DOCUMENTS

| | | |
|---|---|---|
| JP | 10-293391 | 11/1998 |
| JP | 2002-198419 A | 7/2002 |

(Continued)

OTHER PUBLICATIONS

USPTO, (Whitmore) Restriction Requirement, Jul. 24, 2012, in parent U.S. Appl. No. 13/019,778 [pending].

(Continued)

*Primary Examiner* — Vuthe Siek
*Assistant Examiner* — Mohammed Alam
(74) *Attorney, Agent, or Firm* — Fujitsu Patent Center

(57) ABSTRACT

A polishing estimation/evaluation device includes a dividing unit, an overpolished area extracting unit, and a dummy modifying unit. The dividing unit divides a layout of an integrated circuit into a plurality of partial areas. The overpolished area extracting unit refers to an overpolishing condition indicating whether overpolishing occurs in a vicinity of a partial area based on a wiring density in the partial area and a wiring density in surrounding areas of the partial area, and extracts a partial area where the overpolishing occurs from the plurality of partial areas obtained by the division by the dividing unit. The dummy modifying unit modifies dummy wiring in the partial area where the overpolishing occurs extracted by the overpolished area extracting unit and/or dummy wiring in surrounding areas of the partial area to reduce the number of partial areas where the overpolishing occurs.

4 Claims, 12 Drawing Sheets

(56) References Cited

U.S. PATENT DOCUMENTS

| | | |
|---|---|---|
| 2008/0315365 A1 | 12/2008 | Takada |
| 2009/0275264 A1* | 11/2009 | Schlicker et al. ............ 451/5 |
| 2010/0077367 A1* | 3/2010 | Nitta ............................ 716/5 |
| 2010/0299643 A1 | 11/2010 | Izuha et al. |

FOREIGN PATENT DOCUMENTS

| | | |
|---|---|---|
| JP | 2003-347406 A | 12/2003 |
| JP | 2006-165376 A | 6/2006 |
| JP | 2008-235623 A | 10/2008 |
| JP | 2009-004481 A | 1/2009 |
| JP | 2009-170632 A | 7/2009 |
| JP | 2010-272611 | 12/2010 |

OTHER PUBLICATIONS

USPTO [Whitmore] Non-Final Office Action issued Nov. 5, 2012 in parent U.S. Appl. No. 13/019,778 [pending].

USPTO [Whitmore], Notice of Allowance issued Apr. 2, 2013, in parent U.S. Appl. No. 13/019,778 [allowed].

Japanese Office Action mailed Nov. 5, 2013 for corresponding Japanese Application No. 2010-026352, with English-language translation.

* cited by examiner

| Lay | x | y | dens | eff | ddens | err | dum |
|---|---|---|---|---|---|---|---|
| 1 | 0 | 0 | 0.38 | 0.34 | 0.2 | 0 | 0 |
| 1 | 0 | 10 | 0.27 | 0.33 | 0.2 | 0 | 0 |
| 1 | 0 | 20 | 0.25 | 0.33 | 0.2 | 0 | 0 |
| 1 | 0 | 30 | 0.6 | 0.36 | 0.2 | 1 | 0 |
| ⋮ | ⋮ | ⋮ | ⋮ | ⋮ | ⋮ | ⋮ | ⋮ |
| 6 | 2990 | 2990 | 0.38 | 0.24 | 0.15 | 0 | 0 |

| SET NUMBER | sizeX | sizeY | offsetX | offsetY | spaceX | spaceY |
|---|---|---|---|---|---|---|
| 1 | | | | | | |
| 2 | | | | | | |
| 3 | | | | | | |
| ⋮ | | | | | | |

POLISHING ESTIMATION/EVALUATION DEVICE, OVERPOLISHING CONDITION CALCULATION DEVICE, AND COMPUTER-READABLE NON-TRANSITORY MEDIUM THEREOF

CROSS-REFERENCE TO RELATED APPLICATION

This application is a divisional of Ser. No. 13/019,778, filed Feb. 2, 2011, which is based upon and claims the benefit of priority of the prior Japanese Patent Application No. 2010-026352, filed on Feb. 9, 2010, the entire contents of which are incorporated herein by reference.

FIELD

The embodiments discussed herein are directed to a polishing estimation/evaluation device, a polishing estimation/evaluation method, a polishing estimation/evaluation program, an overpolishing condition calculation device, an overpolishing condition calculation method and an overpolishing condition calculation program.

BACKGROUND

In the manufacture of semiconductor integrated circuits, a laminated structure is built by repeating processes of exposing, etching, depositing (plating) and polishing a wafer to form a desired circuit. In the processes, a plurality of semiconductor integrated circuits is formed simultaneously on one wafer to increase productivity.

In particular, in recent years, there has been a demand for increasing the wafer diameter to increase the number of circuits that can be produced at a time. However, as a wafer becomes larger, it is increasingly difficult to process a wafer evenly at the central portion and the peripheral portion thereof. Meanwhile, circuits are more and more miniaturized and high precision processing is asked for.

For example, copper wiring, which prevails in recent years, is formed by electro-chemical plating (ECP) in which wiring grooves are formed on an insulator and the insulator is subjected to copper plating to fill the grooves with copper. Since not only the wiring grooves but also the entire surface of the insulator are covered with the copper plating in this process, chemical mechanical polishing (CMP) is used for polishing to expose a wiring pattern.

If a large height difference is generated on a wafer as a result of the CMP, a height variation in the copper wiring, a short circuit of wiring due to residual copper or the like may be caused. In any case, performance is degraded and yield is decreased.

In the related art, a layout is modified after actually manufacturing the circuits and experiencing an error. This is very inefficient in terms of cost and time cost because a wafer is actually produced. Therefore, a method for simulating the CPM to conduct prediction and modification before manufacture is proposed.

However, if a plurality of materials such as metal for wiring and an insulator is polished, there is a large difference in the polishing rate. Thus, if the density distribution of materials is biased, a phenomenon of overpolishing called an edge over erosion (EOE) occurs. In the EOE, overpolishing abruptly occurs at a rate higher than a polishing rate of a single material.

As an attempt to equalize the density in the related art, dummy wiring is inserted in a layout to thereby equalize the density. However, even if the density is equalized in a semi-automatic manner, the density remains biased. Further, it is unclear whether the EOE is caused by the density bias.

The EOE may occur even the wiring density is within a range defined by a design rule. In addition, if the range of the wiring density is more strictly defined by raising the lower limit, the dummy wiring will be asked for to be inserted more than in the related art. As a result, the configuration will become more complicated and the data size of the layout will increase. Further, since the dummy wiring is provided close to the wiring for actual use, the circuit performance may be degraded due to a change in a signal delay or the like. Accordingly, it is desired to pinpoint and modify a spot where the EOE occurs.

A model of the polishing amount of the EOE is not known, and it is thus difficult to know the occurrence of the EOE in advance by simulating the CMP or the like. However, if it is attempted to equalize the wiring density manually, the workload will be high, and the data size for the layout will be increased because the dummy wiring is arranged irregularly in the layout.

Therefore, it has been an important issue to realize a technique for efficiently designing a layout that suppresses occurrence of the EOE.

SUMMARY

According to an aspect of the invention, a polishing estimation/evaluation device includes: a dividing unit that divides a layout of an integrated circuit, which is to be produced through a deposition process and a polishing process, into a plurality of partial areas; an overpolished area extracting unit that refers to an overpolishing condition indicating whether or not overpolishing occurs in a vicinity of a partial area based on a wiring density in the partial area and a wiring density in surrounding areas of the partial area, and extracts a partial area where the overpolishing occurs from the plurality of partial areas obtained by division by the dividing unit; and a dummy modifying unit that modifies dummy wiring in the partial area where the overpolishing occurs extracted by the overpolished area extracting unit and/or dummy wiring in surrounding areas of the partial area to reduce the number of partial areas where the overpolishing occurs.

According to another aspect of the invention, an overpolishing condition calculation device includes: a test pattern obtaining unit that obtains a layout of a test pattern in which a plurality of areas having different wiring densities are arranged at different intervals; a polishing result obtaining unit that obtains a result of polishing the test pattern; and a condition calculating unit that obtains a relation between a wiring density in an area where overpolishing occurs and a wiring density in surrounding areas of the area as an overpolishing condition based on the layout of the test pattern and the result of polishing.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings.

It should be noted that the disclosed technique is not limited to the embodiments.

EMBODIMENTS

[a] First Embodiment

System Configuration

Figure 1:
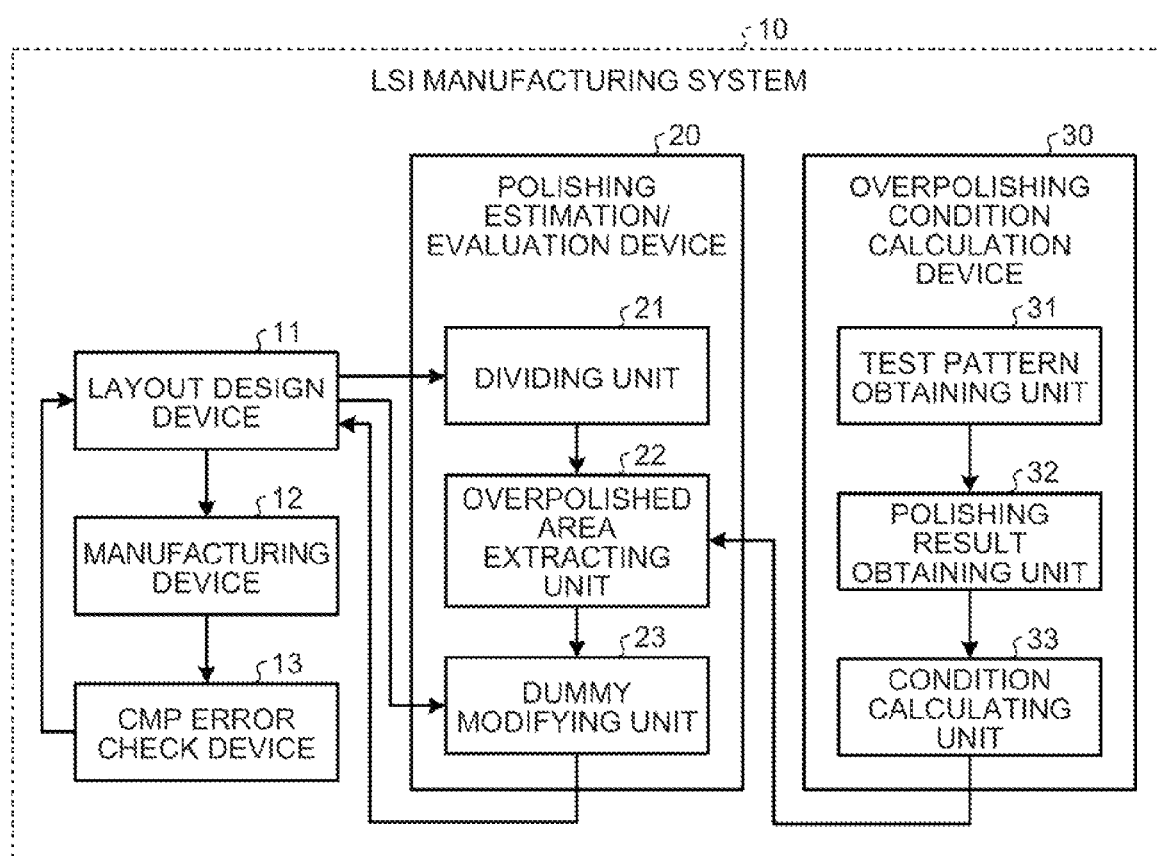
FIG. 1 is a schematic configuration diagram illustrating a schematic configuration of a large scale integrated circuit (LSI) manufacturing system according to an embodiment.

FIG. 1 is a schematic configuration diagram illustrating a schematic configuration of a large scale integrated circuit (LSI) manufacturing system according to the embodiment. As illustrated in FIG. 1, a LSI manufacturing system 10 includes a layout design device 11, a manufacturing device 12, a CMP error check device 13, the polishing estimation/evaluation device 20 and an overpolishing condition calculation device 30.

The layout design device 11 is a device that designs a circuit layout of an LSI, and first outputs the designed circuit layout to the polishing estimation/evaluation device 20. The polishing estimation/evaluation device 20 estimates and evaluates a result of performing the CMP based on the circuit layout, and returns the evaluation result or a modification of the layout to the layout design device 11.

The layout design device 11 modifies the layout if the evaluation result from the polishing estimation/evaluation device 20 is unsatisfactory, and outputs the circuit layout to the manufacturing device 12.

The manufacturing device 12 manufactures LSIs according to the circuit layout obtained from the layout design device 11. Specifically, the manufacturing device 12 evaluates a state after actual polishing using the CMP error check device 13 for each layer (each time after going through exposure, etching, deposition (plating) and polishing), and return the evaluation result to the layout design device 11.

The layout design device 11 reflects the evaluation results from the CMP error check device 13 in the circuit layout, determines a final layout, and passes the final layout to a mass production line, for example.

The polishing estimation/evaluation device 20 includes therein a dividing unit 21, an overpolished area extracting unit 22 and a dummy modifying unit 23. The dividing unit 21 devices the circuit layout received from the layout design device 11 into meshes. A circuit layout is a stack of a plurality of single-layer circuit layouts formed by going through exposure, etching, deposition (plating) and polishing as described above. The dividing unit 21 divides each of the single layer circuit layouts into meshes, which are partial areas. The shape of a mesh is a square 10 μm to 100 μm on each side.

The overpolished area extracting unit 22 refers to an overpolishing condition output from the overpolishing condition calculation device 30 and extracts a partial area where overpolishing occurs from the meshes obtained by the division by the dividing unit 21.

The dummy modifying unit 23 modifies at least one of dummy wiring in a mesh in which overpolishing occurs and dummy wiring in surrounding areas of the mesh to reduce the number of meshes in which overpolishing occurs. The dummy modifying unit 23 outputs the modification result to the layout design device 11.

The overpolishing condition calculation device 30 outputs the overpolishing condition to the polishing estimation/evaluation device 20. The overpolishing condition indicates whether or not overpolishing occurs in the vicinity of a partial area based on the wiring density of the mesh and the wiring density in surrounding areas of the mesh. Specifically, the overpolishing condition calculation device 30 includes a test pattern obtaining unit 31, a polishing result obtaining unit 32 and a condition calculating unit 33.

The test pattern obtaining unit 31 obtains a layout of a test pattern in which a plurality of meshes having different wiring densities is arranged at different intervals. The polishing result obtaining unit 32 obtains a result of polishing the test pattern. The condition calculating unit 33 obtains a relation between the wiring density of a mesh in which overpolishing occurs and the wiring density in surrounding areas of the mesh as the overpolishing condition based on the layout of the test pattern and the result of polishing.

CMP Variation and EOE

Figure 2:
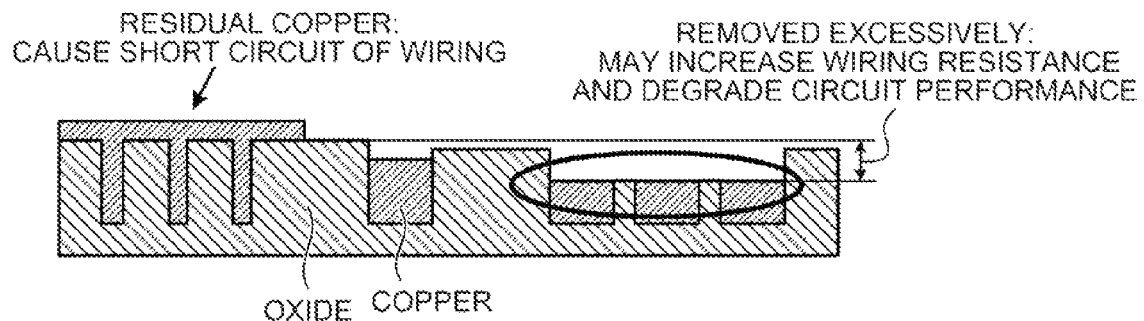
FIG. 2 is a diagram for explaining the evaluation and the risk of the CMP.

FIG. 2 is a diagram for explaining the evaluation and the risk of the CMP. In FIG. 2, concaves and convexes are formed as a result of the CMP. The convexes are formed due to residual of copper deposited by the ECP, and copper remaining on an oxide (such as silicon oxide), which is to insulate copper wires from one another, causes a short circuit of wiring. The concaves are formed by excessively removing copper deposited by the ECP, and cause an increase in the wiring resistance and degradation in the circuit performance.

Figure 3:
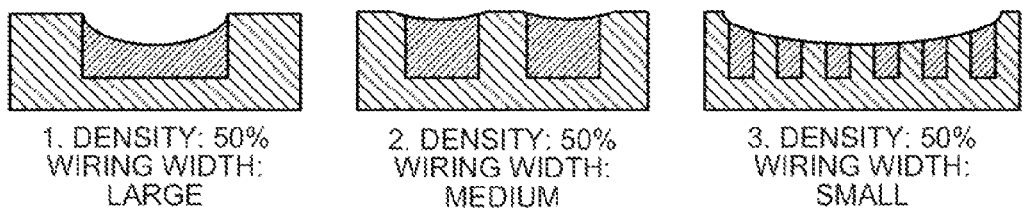
FIG. 3 is a diagram for explaining the removing amount by the CMP.

FIG. 3 is a diagram for explaining the removing amount by the CMP. The polishing rate, namely the removing amount per hour, varies depending not only on the wiring density but also on the wiring width. As illustrated in FIG. 3, even if the wiring density is 50%, the wiring portion is removed largely when the wiring width is large. This is because copper is more easily removed than the oxide. It is also more easily removed as a whole if the wiring density is smaller because the width of the oxide is also smaller. In contrast, if the wiring density is medium, the polishing rate is small since the oxide has such a width that it is sufficiently resistant to the CMP and is arranged at suitable intervals.

Figure 4:
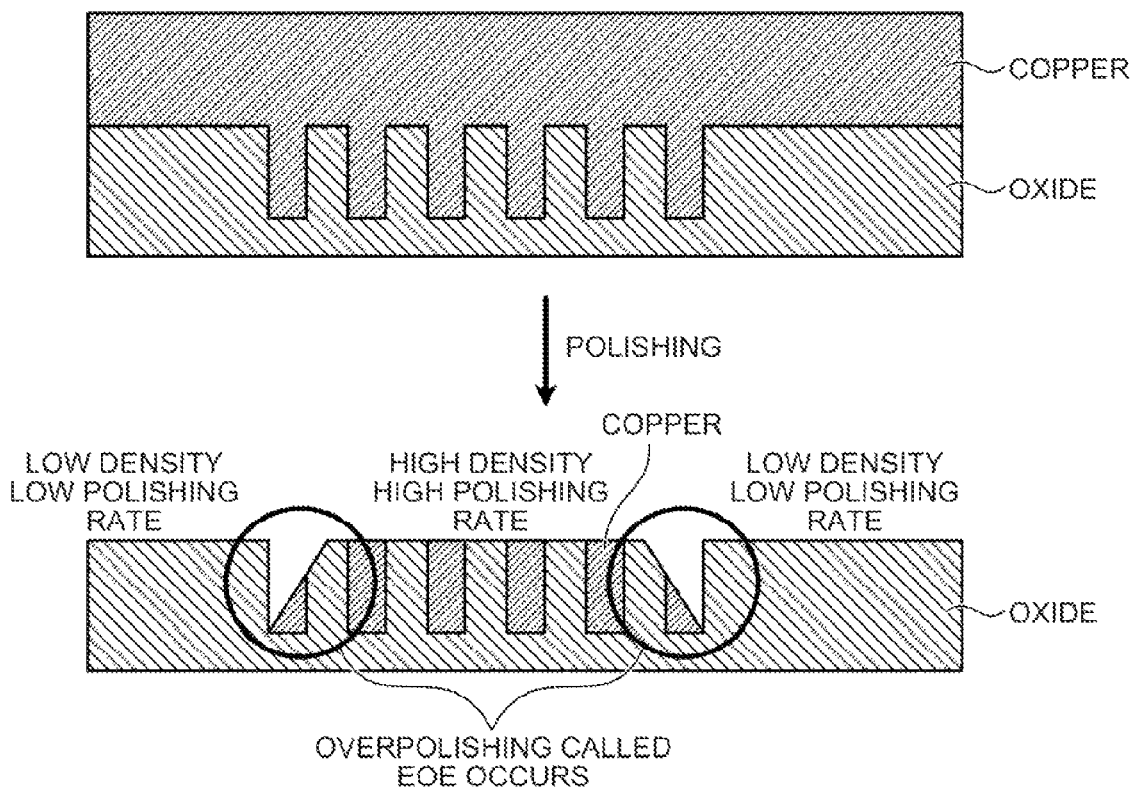
FIG. 4 is a diagram for explaining the EOE.

FIG. 4 is a diagram for explaining the EOE. If areas having different wiring densities are adjacent to each other, the EOE may occur, in which the vicinity of boundary portion of the areas is removed at a rate higher than the original polishing rate. In the example illustrated in FIG. 4, an area in which the wiring density is low and the polishing rate is low and an area in which the wiring density is high and the polishing rate is high are adjacent to each other, and the EOE is present in the high polishing rate area.

Overpolishing Condition

The condition for the occurrence of the EOE is a combination of the density of the spot where the EOE occurs (density), the density of a broad area including surrounding areas of the spot (effective density), the lowest density in the surrounding areas, the difference between the density and the effective density and the like. The overpolishing condition calculation device 30 performs measurement on the spot where the EOE is present based on a result of polishing a test pattern (TEG: test element group) and calculates a conditional expression to determine the condition for the occurrence of the EOE.

The polishing estimation/evaluation device 20 inserts dummy data in actual chip data and determines the spot where the EOE occurs (hot spot) based on the overpolishing conditional expression. Any existing method can be used for the insertion of dummy data.

Figure 5:
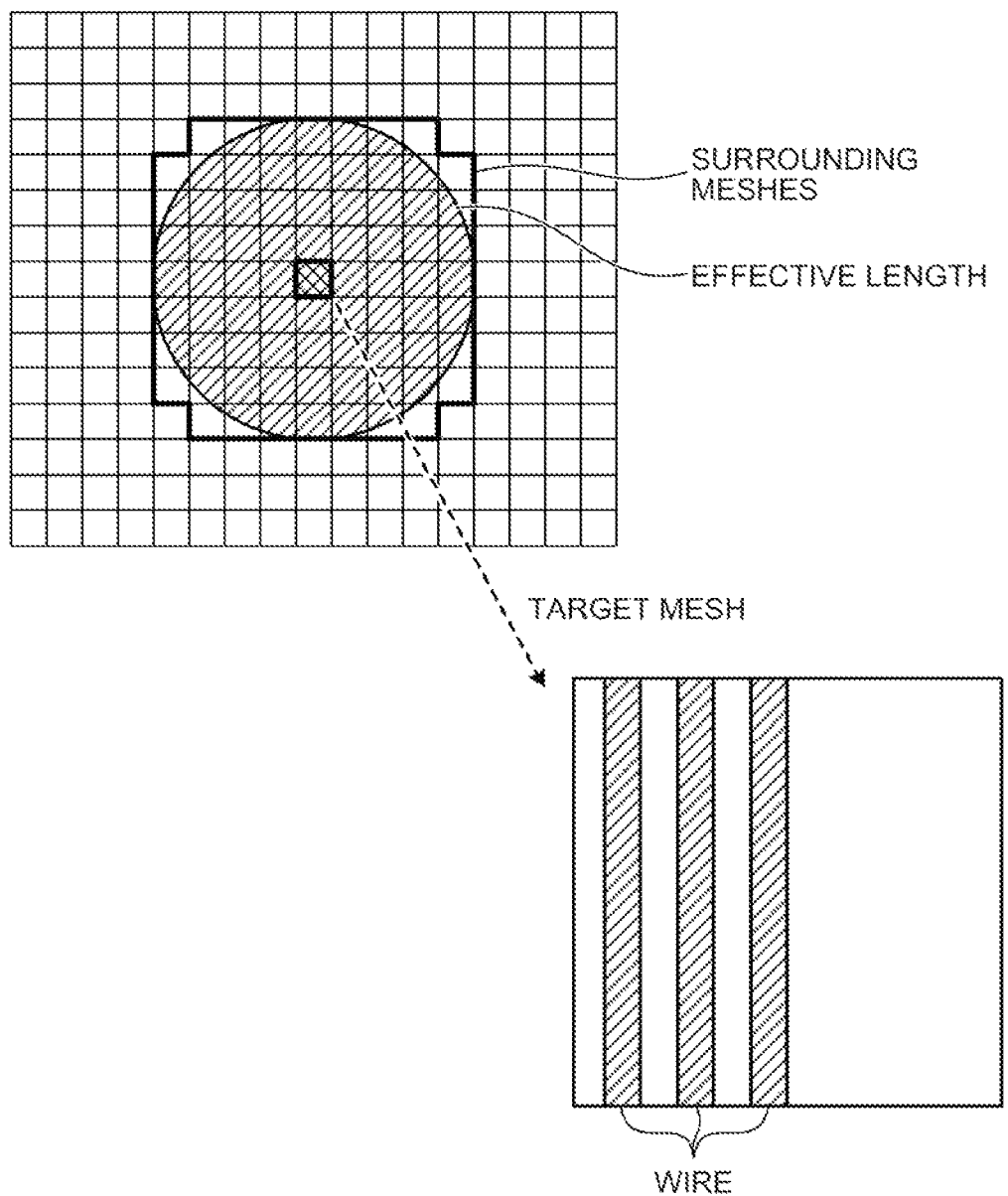
FIG. 5 is a diagram for explaining extraction of a spot where the EOE occurs.

FIG. 5 is a diagram for explaining extraction of a spot where the EOE occurs. As illustrated in FIG. 5, an average value of the wiring density of meshes present within a predetermined distance from a target mesh is used as the surrounding wiring density. The predetermined distance is an effective length illustrated in FIG. 5, and meshes that are included at least in part within the effective length are surrounding meshes of a target mesh.

The polishing estimation/evaluation device 20 uses the wiring densities of the target mesh and the surrounding meshes and the overpolishing conditional expression to extract the mesh where the EOE occurs. Then, the dummy wiring in the mesh where the EOE occurs is modified.

Figure 6:
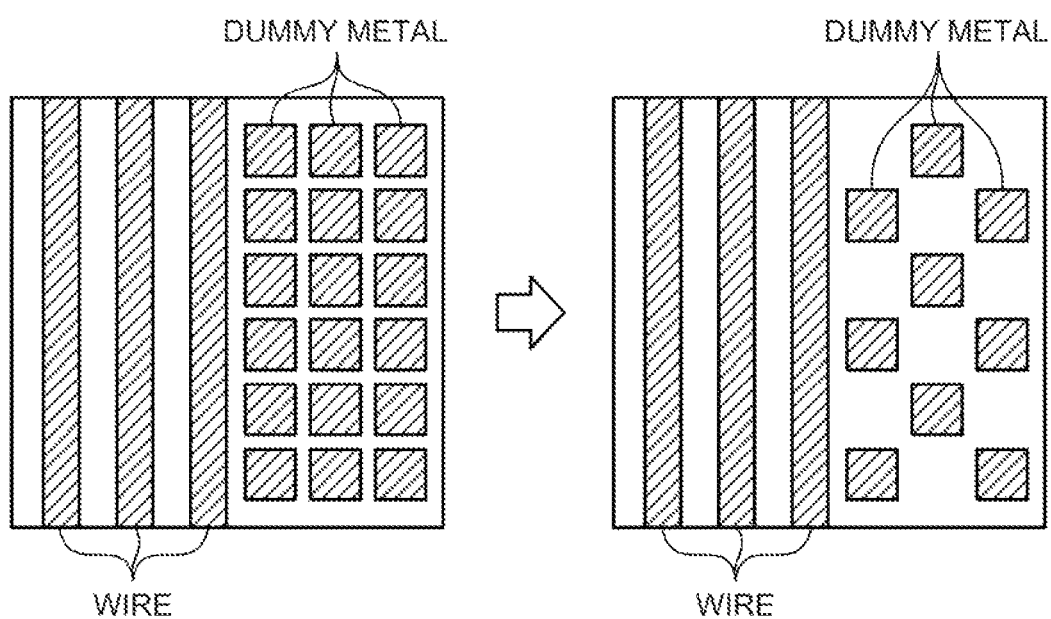
FIG. 6 is a diagram for explaining a modification of dummy wiring.

FIG. 6 is a diagram for explaining modification of dummy wiring. In the example illustrated in FIG. 6, modification is performed to reduce the dummy wiring (dummy metal) to lower the wiring density of the target mesh. By lowering the wiring density in this manner, the difference between the lowered wiring density and the wiring density of the surrounding meshes becomes smaller, and thus the occurrence of the EOE may be eliminated.

Similarly, the occurrence of the EOE may also be eliminated by increasing the dummy wiring of the surrounding meshes to increase the wiring density. Specifically, the modification of the dummy wiring is performed by selecting a dummy rule defining the arrangement of the dummy wiring.

Figure 7:
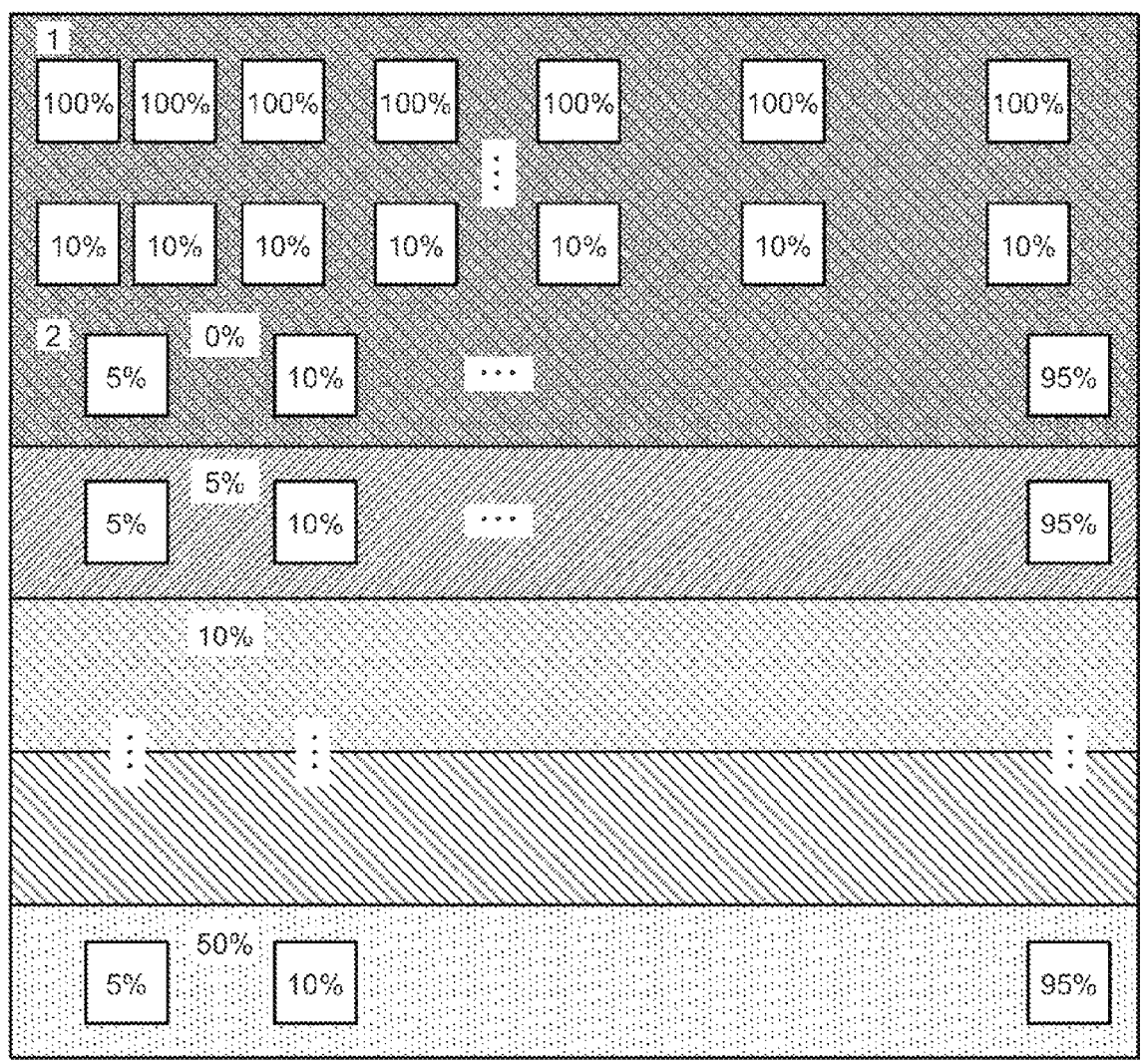
FIG. 7 illustrates a specific example of a test pattern for determining an overpolishing condition.

FIG. 7 illustrates a specific example of a test pattern for determining an overpolishing condition. In the example illustrated in FIG. 7, an upper portion of the test pattern is arranged in a manner that areas having a wiring density of 100% are arranged in an area having a wiring density of 0% at different intervals.

In the example illustrated in FIG. 7, the interval between the areas having a wiring density of 100% becomes smaller toward the left and larger toward the right. If the interval between the areas having a wiring density of 100% is small, areas having a wiring density of 100% in the vicinity are surrounding areas and thus the difference in the wiring density is small. Accordingly, the EOE does not occur. On the other hand, if the interval between the areas having a wiring density of 100% is large, areas having a wiring density of 100% in the vicinity are not included in the surrounding areas. Accordingly, the EOE occurs. Therefore, the effective length can be determined depending on the position on the test pattern on which the EOE occurs.

In addition, in the test pattern illustrated in FIG. 7, areas having a wiring density that is sequentially changed to 10% are arranged in the area having the wiring density of 0% in the same manner as the areas having a wiring density of 100%. As a result of polishing on the arrangement, a relation between the wiring density and the effective length in a state where the surrounding wiring density is 0% can be obtained.

Further, in the test pattern illustrated in FIG. 7, areas having a wiring density that is sequentially changed from 5% to 95% are arranged in the area having a wiring density of 0% at sufficient intervals. As a result of polishing on the arrangement, a condition of the wiring density in which the EOE occurs in a state where the surrounding wiring density is 0% can be obtained.

Similarly, in the test pattern illustrated in FIG. 7, areas having a wiring density that is sequentially changed from 5% to 95% are arranged in each of areas having a wiring density of 5 to 50% at sufficient intervals. As a result of polishing on the arrangement, a condition of the relation between the surrounding wiring density and the target wiring density of the spot where the EOE occurs can be obtained.

Description of Processing Operations

Figure 8:
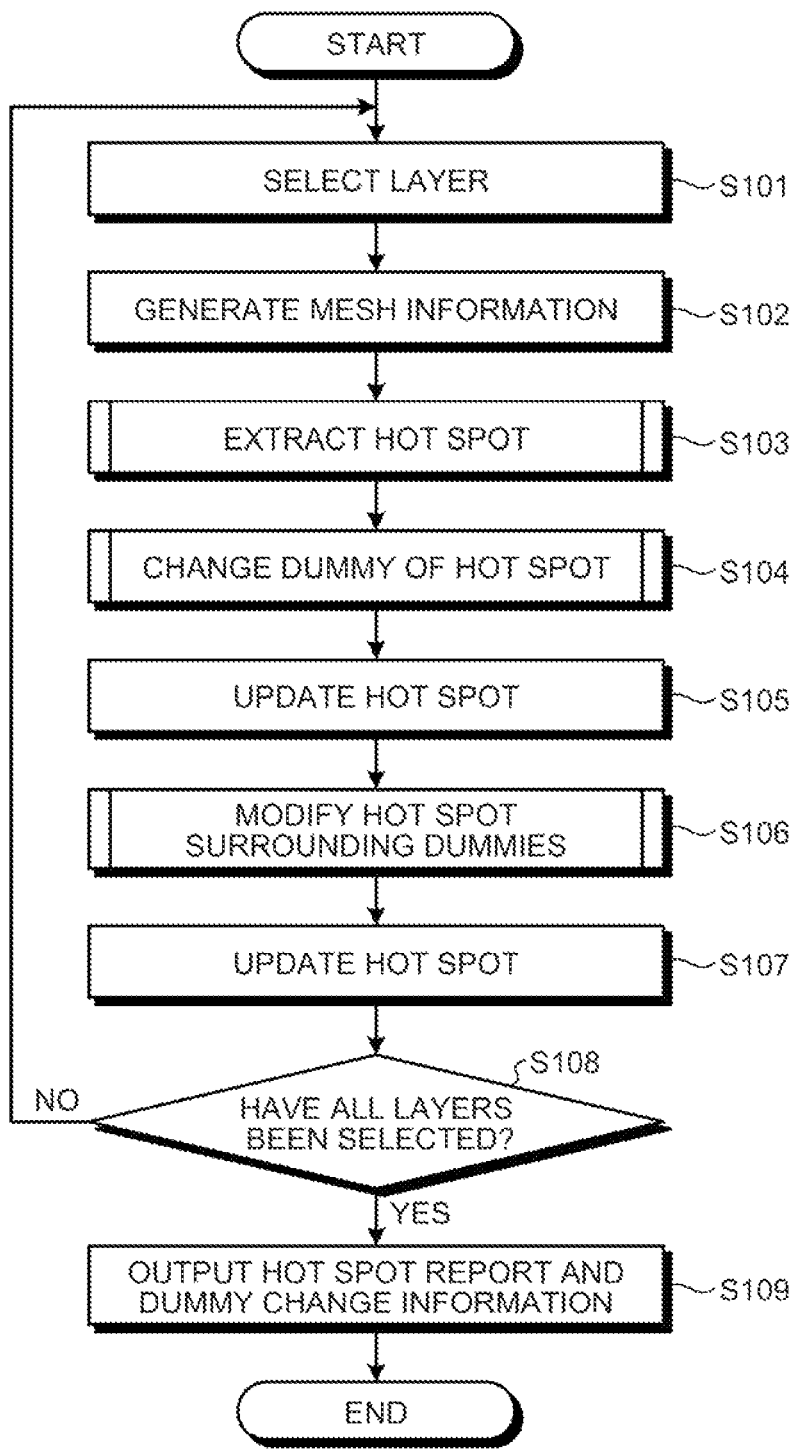
FIG. 8 is a flowchart explaining processing operations of a polishing estimation/evaluation device 20.

FIG. 8 is a flowchart explaining processing operations of the polishing estimation/evaluation device 20. First, the dividing unit 21 selects a layer of a circuit layout (S101), and divides the circuit layout of the selected layer to generate mesh information (S102). The overpolished area extracting unit 22 extracts a mesh where the EOE occurs, namely a hot spot, based on the mesh information and the overpolishing condition (S103).

The dummy modifying unit 23 modifies the dummy wiring of the extracted hot spot (S104). Then, the overpolished area extracting unit 22 extracts a hot spot again from the layout in which the dummy wiring is modified to update the hot spots (S105).

The dummy modifying unit 23 modifies the dummy wiring in surrounding meshes of each hot spot of the updated hot spots (S106). Then, the overpolished area extracting unit 22 extracts a hot spot again from the layout in which the dummy wiring is modified to update the hot spots (S107).

After S107, the dividing unit 21 determines whether all the layers have been selected (S108). If any layer remains unselected (S108, No), the dividing unit 21 returns to the selection of a layer (S101). If all the layers have been selected (S108, Yes), the dummy modifying unit 23 outputs hot spots that finally remains as a hot spot report, also outputs information of the modified dummies (S109), and terminates the process.

Figure 9:
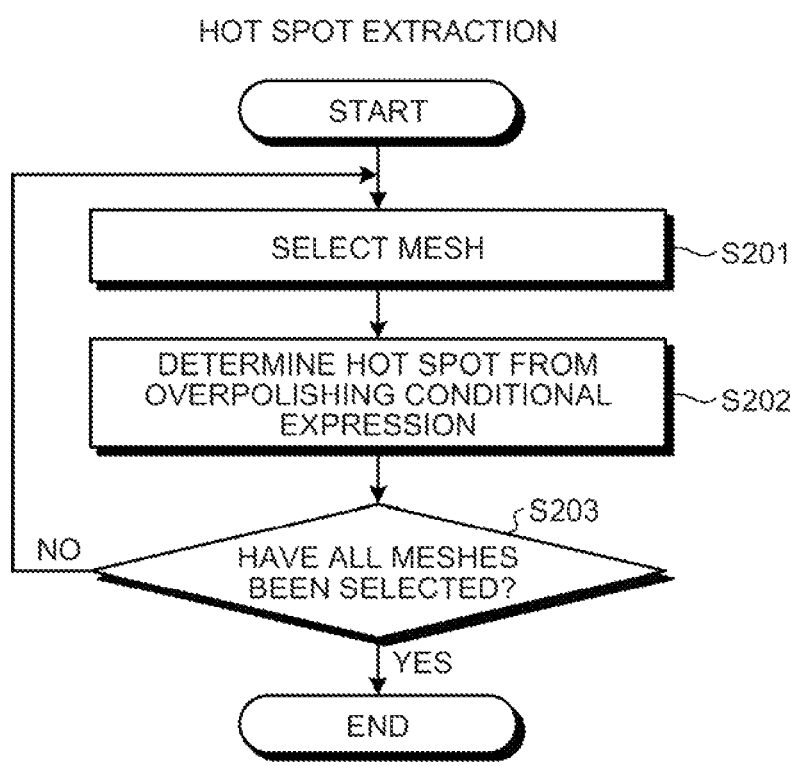
FIG. 9 is a flowchart explaining details of a hot spot extracting process described in FIG. 8.

FIG. 9 is a flowchart explaining details of a hot spot extracting process described in FIG. 8. When the hot spot extracting process is initiated, the overpolished area extracting unit 22 selects one of meshes of the selected layer (S201), and applies the selected mesh in the overpolishing conditional expression to determine whether or not it is a hot spot (S202). Then, the overpolished area extracting unit 22 determines whether all the meshes have been selected (S203). If any mesh remains unselected (S203, No), the overpolished area extracting unit 22 returns to the selection of a mesh (S201). If all the layers have been selected (S203, Yes), the overpolished area extracting unit 22 terminates the hot spot extracting process.

Figure 10:
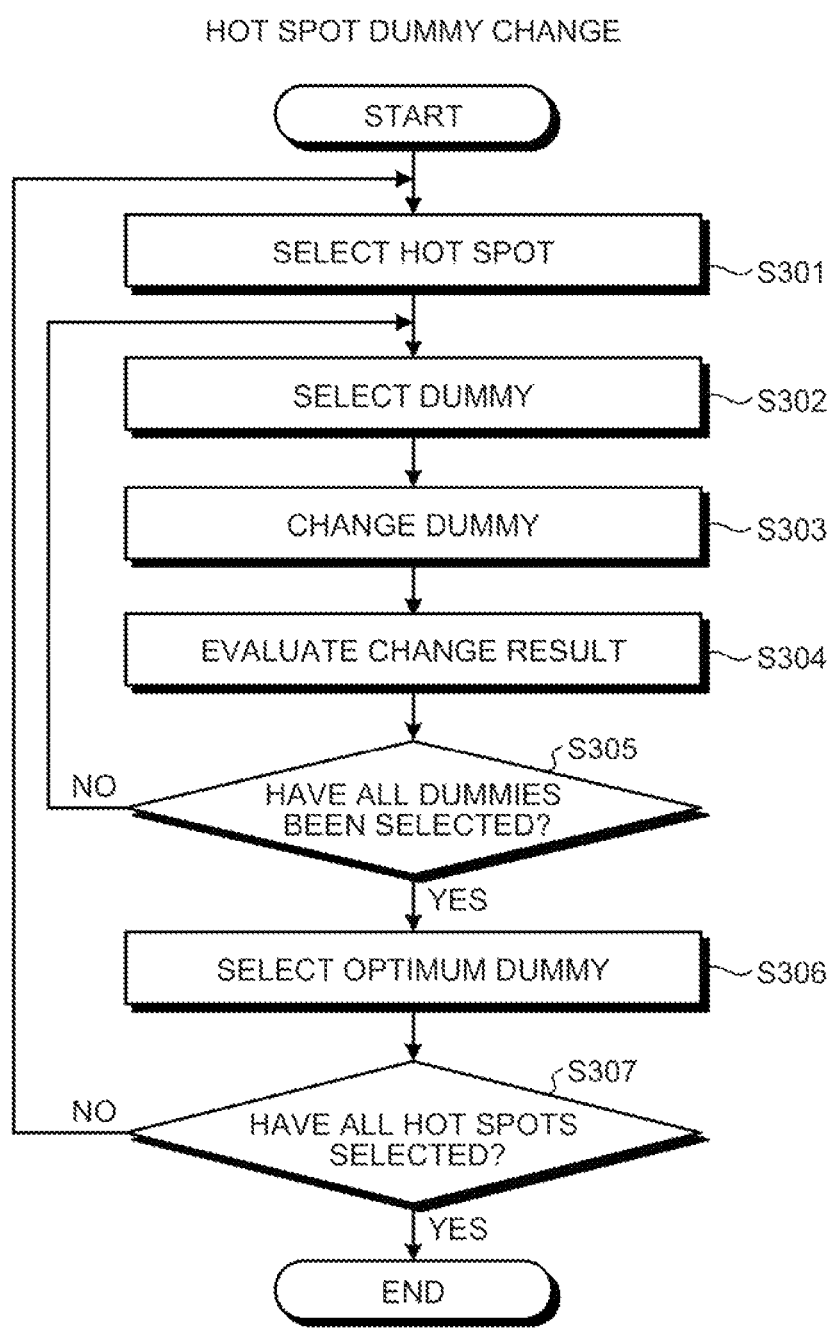
FIG. 10 is a flowchart explaining details of a hot spot dummy changing process described in FIG. 8.

FIG. 10 is a flowchart explaining details of a hot spot dummy changing process described in FIG. 8. When the hot spot dummy changing process is initiated, the dummy modifying unit 23 selects one hot spot (S301). In addition, the dummy modifying unit 23 selects a dummy rule (S302) to change the dummy wiring (S303) and evaluates the change result (S304).

Then, the dummy modifying unit 23 determines whether all the dummy rules have been selected (S305). If any dummy rule remains unselected (S305, No), the dummy modifying unit 23 returns to the selection of a dummy rule (S302). If all the dummy rules have been selected (S305, Yes), the dummy modifying unit 23 compares the evaluation results of application of the respective dummy rules, and selects an optimum dummy rule (S306).

Specifically, the dummy modifying unit 23 selects an optimum dummy rule depending on whether the selected hot spot itself is eliminated and how the number of the other hot spots included in surrounding meshes of the selected hot spot changes in the results of applying the respective dummy rules. Dummy rules in which the numbers of the hot spots are the same are selected in a manner that a dummy rule having a wiring density closer to the surrounding wiring density is selected in preference so as to reduce variation in the density in the surrounding areas. Although an example in which all the dummy rules are sequentially selected and tested is described herein, the dummy rules may be selected in a manner that a dummy rule having lower density than a dummy rule specified in an original layout is selected in preference.

After selecting the optimum dummy rule, the dummy modifying unit 23 determines whether all the hot spots have been selected (S307). If any hot spot remains unselected (S307, No), the dummy modifying unit 23 returns to the selection of a hot spot (S301). If all the hot spots have been selected (S307, Yes), the dummy modifying unit 23 terminates the hot spot dummy changing process.

Figure 11:
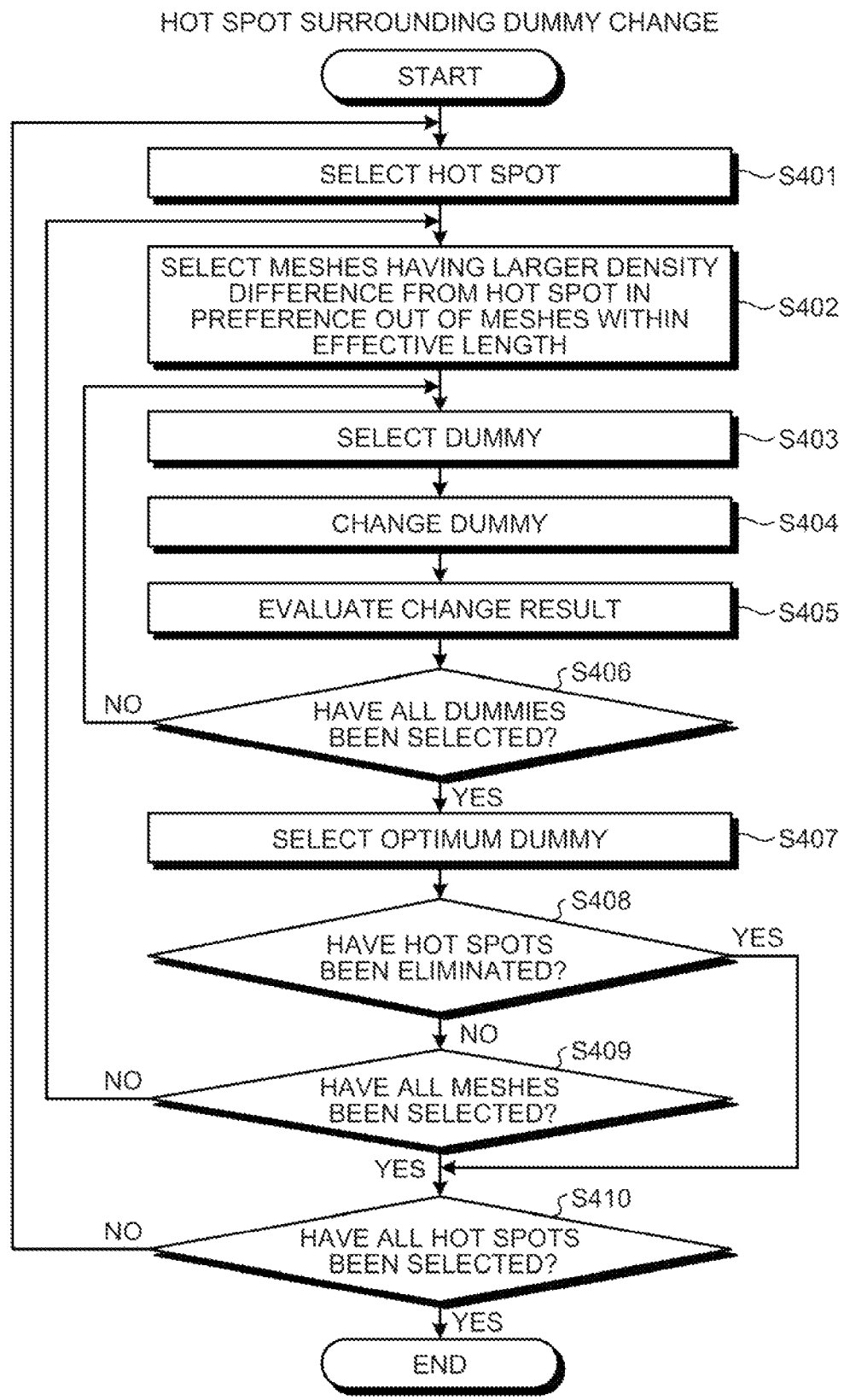
FIG. 11 is a flowchart explaining details of a hot spot surrounding dummy changing process described in FIG. 8.

FIG. 11 is a flowchart explaining details of a hot spot surrounding dummy changing process described in FIG. 8. When the hot spot surrounding dummy changing process is initiated, the dummy modifying unit 23 selects one hot spot (S401). Further, the dummy modifying unit 23 selects a predetermined number of meshes having larger density difference from the selected hot spot out of meshes within the effective length of the hot spot in preference (S402).

Then, the dummy modifying unit 23 selects a dummy rule (S403), changes the dummy wiring of the predetermined number of selected meshes (S404), and evaluates the change result (S405). Then, the dummy modifying unit 23 determines whether all the dummy rules have been selected (S406). If any dummy rule remains unselected (S406, No), the dummy modifying unit 23 returns to the selection of a dummy rule (S403). If all the dummy rules have been selected (S406, Yes), the dummy modifying unit 23 compares the evaluation results of application of the respective dummy rules, and selects an optimum dummy rule (S407).

Specifically, the dummy modifying unit 23 selects an optimum dummy rule depending on whether the selected hot spot itself is eliminated and how the number of the other hot spots included in surrounding meshes of the selected hot spot changes in the results of applying the respective dummy rules. Dummy rules in which the numbers of the hot spots are the same are selected in a manner that a dummy rule having a wiring density closer to the surrounding wiring density is selected in preference so as to reduce variation in the density in the surrounding areas. Although an example in which all the dummy rules are sequentially selected and tested is described herein, the dummy rules may be selected in a manner that a dummy rule having higher density than a dummy rule specified in an original layout is selected in preference.

After selecting the optimum dummy rule, the dummy modifying unit 23 determines whether the hot spot is eliminated (S408). If the hot spot is not eliminated (S408, No), the dummy modifying unit determines whether or not all the surrounding meshes of the selected hot spot have been selected (S409). If any surrounding mesh remains unselected, the dummy modifying unit 23 returns to the selection of a surrounding mesh (S402).

If all the surrounding meshes have been selected (S409, Yes) or if the hot spot is eliminated (S407), the dummy modifying unit 23 determines whether all the hot spots have been selected (S410). If any hot spot remains unselected (S410, No), the dummy modifying unit 23 returns to the selection of a hot spot (S401). If all the hot spots have been selected (S410, Yes), the dummy modifying unit 23 terminates the hot spot surrounding dummy changing process.

Specific Examples of Data

Figures 12, 13:
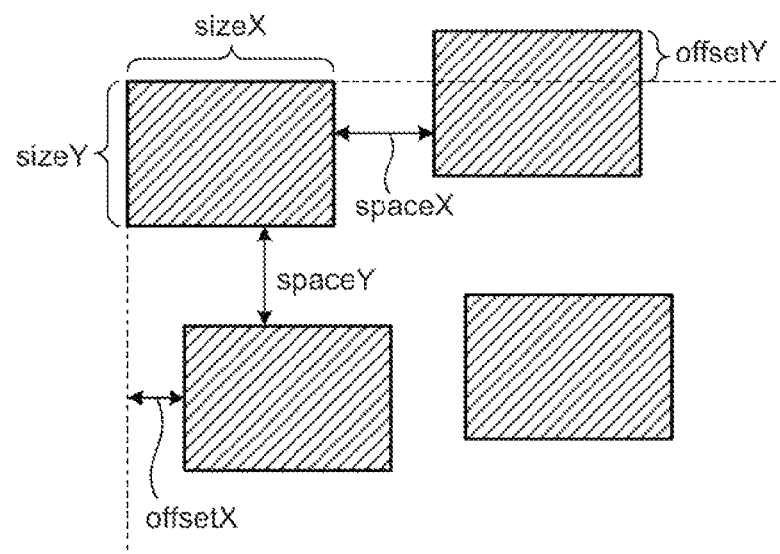
FIG. 12 is a table for explaining data of meshes used by the polishing estimation/evaluation device 20.
FIG. 13 is a diagram for explaining a specific example of a dummy rule.

FIG. 12 is a table for explaining data of meshes used by the polishing estimation/evaluation device 20. The data of meshes illustrated in FIG. 12 includes items of a layer (Lay), a mesh coordinate (x), a mesh coordinate (y), a wiring density (dens) and a dummy wiring density (ddens). In addition, the data of meshes illustrated in FIG. 12 includes items of a wiring density (eff) at the effective length, error information (err) and dummy change information (dum).

The item of the layer (Lay) indicates the layer whose layout out of the circuit layout is divided to obtain the mesh. The mesh coordinate x and the mesh coordinate y are information indicating a position of the mesh obtained by division to identify the mesh. The wiring density dens indicates the wiring density of the mesh, and the dummy wiring density ddens indicates the proportion of the wiring density of dummy wiring out of the wiring density dens.

The wiring density eff at the effective length is an average value of the wiring densities of the surrounding meshes located within the effective length from the mesh. The error information err is information indicating whether the mesh is a mesh where overpolishing occurs, namely a hot spot. The mesh is a hot spot if the value of the error information err is 1, while the mesh is not a hot spot if the value of the error information is 0. The dummy change information dum is information indicating whether the dummy wiring has been modified or not, and what is the dummy rule to be applied after the modification if the dummy wiring has been modified.

In the example illustrated in FIG. 12, the circuit layout includes six layers and the value of Lay is any one of 1 to 6. In addition, the circuit layout of a single layer is divided into three hundred in the x and y directions in 10 μm units, and x and y each have a value of 0 to 2990 in tens.

Specifically, in the example illustrated in FIG. 12, a mesh at (x, y)=(0, 0) in the first layer has dens=0.38, eff=0.34, ddens=0.2, err=0 and dum=0. Further, a mesh at (x, y)=(0, 10) in the first layer has dens=0.27, eff=0.33, ddens=0.2, err=0 and dum=0.

Similarly, a mesh at (x, y)=(0, 20) in the first layer has dens=0.25, eff=0.33, ddens=0.2, err=0 and dum=0, and a mesh at (x, y)=(0, 30) in the first layer has dens=0.6, eff=0.36, ddens=0.2, err=1 and dum=0. Further, a mesh at (x, y)=(2990, 2990) in the sixth layer has dens=0.38, eff=0.24, ddens=0.15, err=0 and dum=0.

The item of the dummy change information dum indicates that the dummy is not modified, that is, the layout is still the original layout if the value is 0, and indicates a set number of the dummy rule to be applied after the modification if the value is other than 0.

FIG. 13 is a diagram for explaining a specific example of a dummy rule. The dummy rule includes items of the set number, sizeX, sizeY, offsetX, offsetY, spaceX and spaceY. The set number is an identification number of the dummy rule and is a value other than 0. sizeX indicates the length of a dummy wire to be inserted in the X direction, and sizeY indicates the length of a dummy wire to be inserted in the Y direction. offsetX indicates how much the dummy wire are shifted in the X direction when a plurality of dummy wires is inserted, and offsetY indicates how much the dummy wires are shifted in the Y direction when a plurality of dummy wires is inserted. spaceX indicates an interval between dummy wires arranged in the X direction when a plurality of dummy wires is inserted, and spaceY indicates an interval between dummy wires arranged in the Y direction when a plurality of dummy wires is inserted.

[b] Second Embodiment

Embodiment of Program

Figure 14:
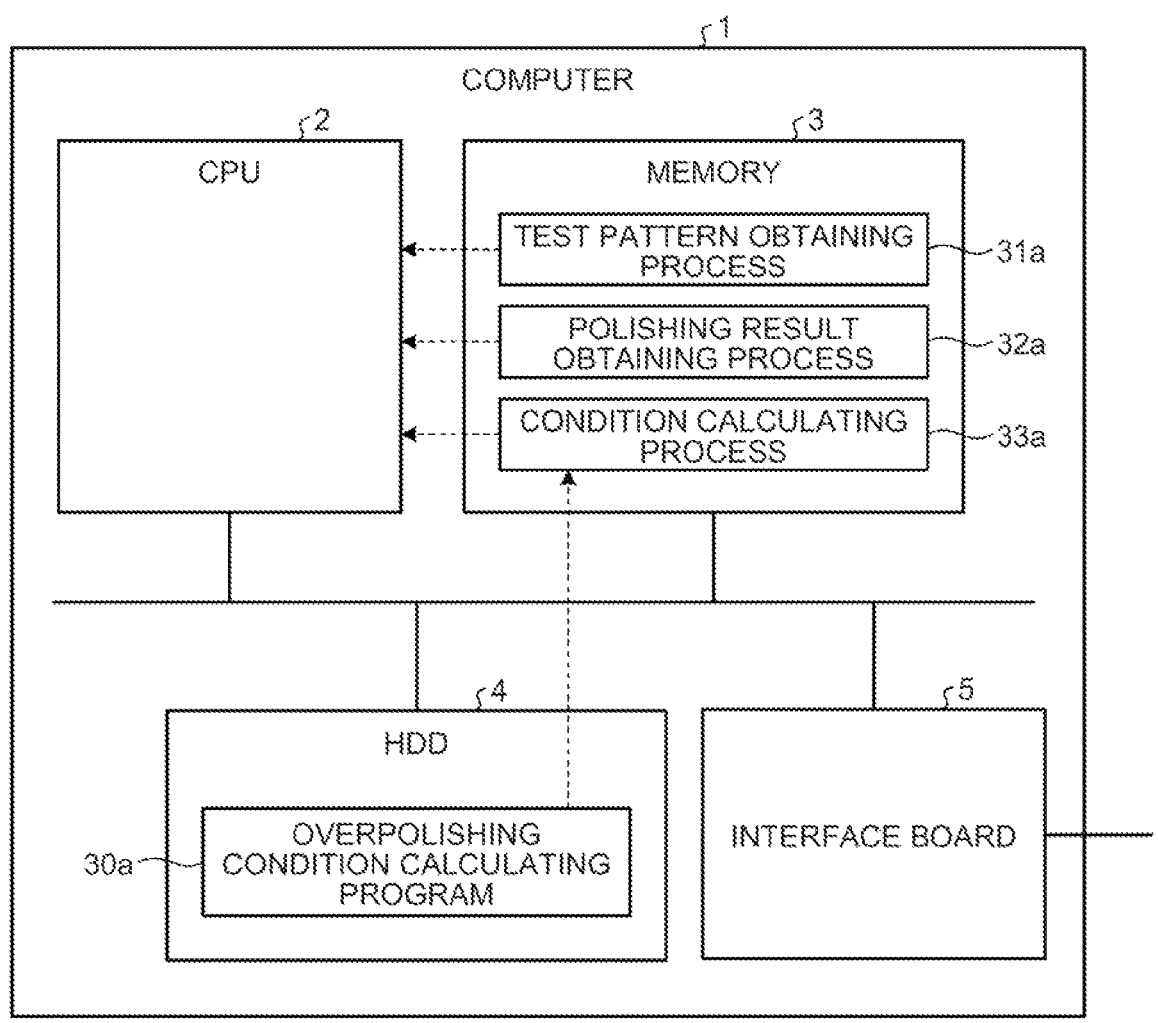
FIG. 14 illustrates an embodiment of an overpolishing condition calculation program.

FIG. 14 illustrates an embodiment of an overpolishing condition calculation program. A computer system 1 illustrated in FIG. 14 includes a central processing unit (CPU) 2, a memory 3, a hard disk drive (HDD) 4, and an interface board 5.

The HDD 4 holds an overpolishing condition calculation program 30a on a magnetic disk. When the computer 1 develops and executes the overpolishing condition calculation program 30a in the memory 3, a test pattern obtaining process 31a, a polishing result obtaining process 32a and a condition calculating process 33a are executed. The test pattern obtaining process 31a performs processing corresponding to that of the test pattern obtaining unit 31 illustrated in FIG. 1. The polishing result obtaining process 32a performs processing corresponding to that of the polishing result obtaining unit 32 illustrated in FIG. 1. The condition calculating process 33a performs processing corresponding to the condition calculating unit 33 illustrated in FIG. 1.

In this manner, the computer 1 can operate as an overpolishing condition calculation device by reading and executing the overpolishing condition calculation program 30a. Data used in the respective processes can be obtained from outside via the interface board 5, and data output in the respective processes can be output to outside via the interface board 5.

Figure 15:
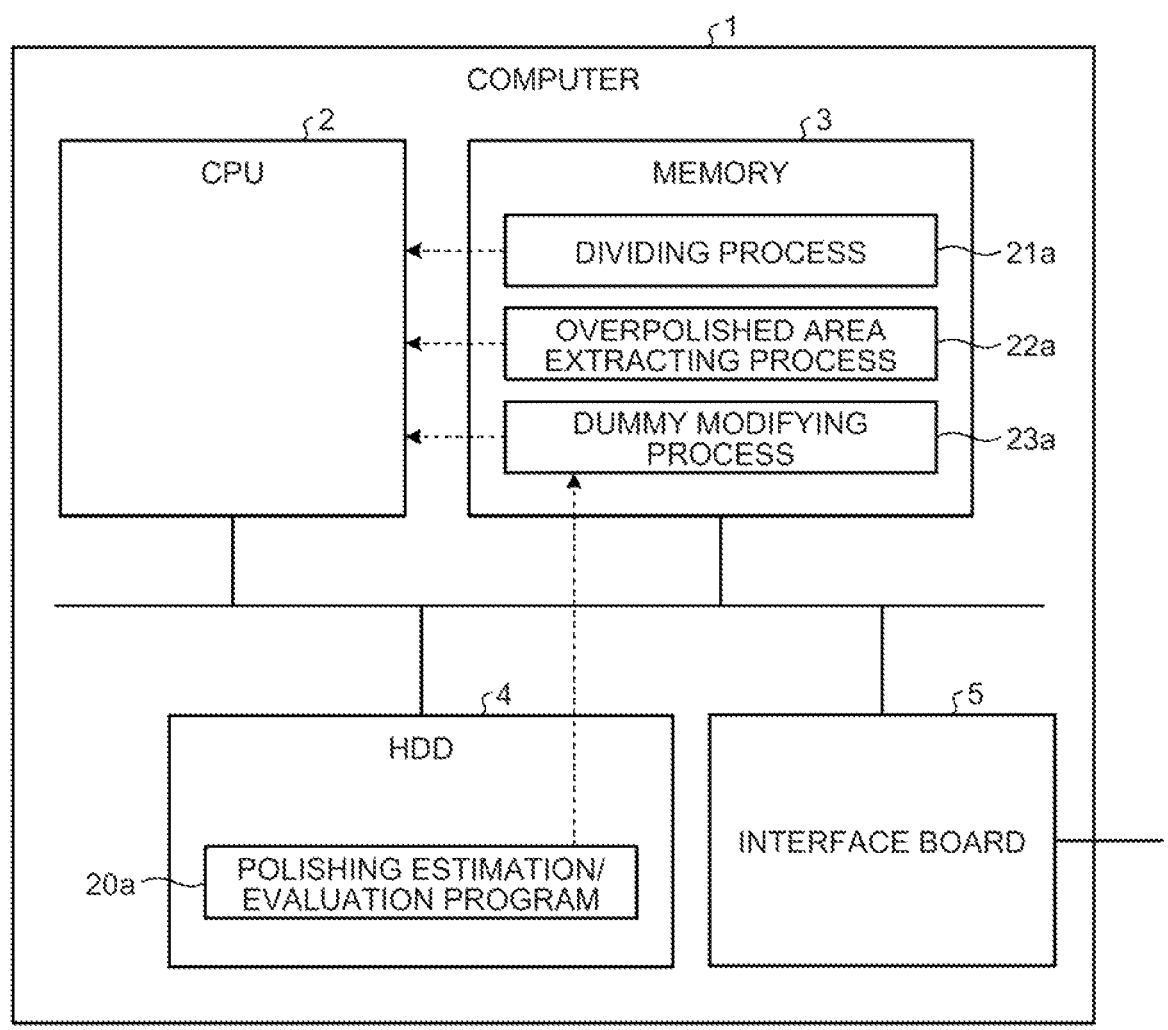
FIG. 15 illustrates an embodiment of a polishing estimation/evaluation program.

FIG. 15 illustrates an embodiment of a polishing estimation/evaluation program. A computer system 1 illustrated in FIG. 15 includes the central processing unit (CPU) 2, the memory 3, the hard disk drive (HDD) 4, and the interface board 5.

The HDD 4 holds a polishing estimation/evaluation program 20a on a magnetic disk. When the computer 1 develops and executes the polishing estimation/evaluation program 20a in the memory 3, a dividing process 21a, an overpolished area extracting process 22a and a dummy modifying process 23a are executed. The dividing process 21a performs processing corresponding to that of the dividing unit 21 illustrated in FIG. 1. The overpolished area extracting process 22a performs processing corresponding to that of the overpolished area extracting unit 22 illustrated in FIG. 1. The dummy modifying process 23a performs processing corresponding to that of the dummy modifying unit 23 illustrated in FIG. 1.

In this manner, the computer 1 can operate as an overpolishing condition calculation device by reading and executing the polishing estimation/evaluation program 20a. Data used in the respective processes can be obtained from outside via the interface board 5, and data output in the respective processes can be output to outside via the interface board 5.

The computer that executes the polishing estimation/evaluation program 20a and the computer that executes the overpolishing condition calculation program 30a may be the same or different computers. Although examples in which programs are stored in the HDD are described with reference to FIGS. 14 and 15, any recording medium such as a compact disc (CD) may be used to store the programs.

As described above, according to the device, the method and the program disclosed in the embodiments, a layout of an integrated circuit is divided into a plurality of meshes, an overpolishing condition is referred to based on the wiring density of a mesh and the wiring density of surrounding meshes to extract a mesh where the EOE occurs. In addition, according to the disclosed device, method and program, dummy wiring of the mesh where the EOE occurs and the surrounding meshes is modified to suppress occurrence of the EOE.

The disclosed device, method and program uses a combination of conditions including the wiring density of a mesh, the wiring density of surrounding meshes, the lowest value of the wiring density in the surrounding meshes, the difference between the wiring density of the mesh and the wiring density of the surrounding meshes, and the like as the overpolishing condition. Therefore, a spot where the EOE occurs can be extracted by simple processing. Since the wiring density of surrounding meshes in the overpolishing conditions is an average value of wiring densities of meshes present within a predetermined distance from a target mesh, the data amount can be suppressed and determination can be made by simple processing.

According to the disclosed device, method and program, after dummy arrangement of a mesh where the EOE occurs is modified, a mesh where the EOE occurs is extracted again in the modified layout, and dummy modification of surrounding meshes is performed for the remaining meshes. Therefore, spots where the EOE occurs can be efficiently reduced.

According to the disclosed device, method and program, effects of obtaining a polishing estimation/evaluation device, a polishing estimation/evaluation method, a polishing estimation/evaluation program, an overpolishing condition calculation device, an overpolishing condition calculation method and an overpolishing condition calculation program that suppress occurrence of overpolishing in the CMP are produced.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An overpolishing condition calculation device comprising:
a test pattern obtaining unit that obtains a layout of a test pattern in which a plurality of areas having different wiring densities are arranged at different intervals;
a polishing result obtaining unit that obtains a result of polishing the test pattern; and
a condition calculating unit that obtains a relation between a wiring density in an area where overpolishing occurs and a wiring density in surrounding areas of the area as an overpolishing condition based on the layout of the test pattern and the result of polishing, wherein
an upper portion of the test pattern for determining the overpolishing condition is arranged in a manner that areas having a wiring density of 100% are arranged in an area having a wiring density of 0% at different intervals, the interval between the areas having a wiring density of 100% becomes smaller toward the left so that areas having a wiring density of 100% in the vicinity are surrounding areas and a difference in the wiring density is small so as to suppress occurrence of Edge Over Erosion (EOE), and the interval between the areas having the wiring density of 100% becomes larger toward the right so that the areas having the wiring density of 100% in the vicinity are not included in the surrounding areas and the difference in the wiring density is large so as to accelerate the occurrence of the Edge Over Erosion (EOE).

2. The overpolishing condition calculation device according to claim 1, wherein the condition calculating unit obtains a combination of conditions including any of the wiring density in the area, the wiring density in the surrounding areas of the area, a lowest value of the wiring density in the surrounding areas, and a difference between the wiring density in the area and the wiring density in the surrounding areas.

3. An overpolishing condition calculation device comprising:

a processor configured to execute a procedure, the procedure comprising:

obtaining a layout of a test pattern in which a plurality of areas having different wiring densities are arranged at different intervals;

obtaining a result of polishing the test pattern; and obtaining a relation between a wiring density in an area where overpolishing occurs and a wiring density in surrounding areas of the area as an overpolishing condition based on the layout of the test pattern and the result of polishing, wherein an upper portion of the test pattern for determining the overpolishinq condition is arranged in a manner that areas having a wiring density of 100% are arranged in an area having a wiring density of 0% at different intervals, the interval between the areas having a wiring density of 100% becomes smaller toward the left so that areas having a wiring density of 100% in the vicinity are surrounding areas and a difference in the wiring density is small so as to suppress occurrence of Edge Over Erosion (EOE), and the interval between the areas having the wiring density of 100% becomes larger toward the right so that the areas having the wiring density of 100% in the vicinity are not included in the surrounding areas and the difference in the wiring density is large so as to accelerate the occurrence of the Edge Over Erosion (EOE).

4. A computer-readable, non-transitory medium stored therein an overpolishing condition calculation program, the program causing a computer to execute a procedure, the procedure comprising:

obtaining a layout of a test pattern in which a plurality of areas having different wiring densities are arranged at different intervals;

obtaining a result of polishing the test pattern; and obtaining a relation between a wiring density in an area where overpolishing occurs and a wiring density in surrounding areas of the area as an overpolishing condition based on the layout of the test pattern and the result of polishing, wherein an upper portion of the test pattern for determining the overpolishing condition is arranged in a manner that areas having a wiring density of 100% are arranged in an area having a wiring density of 0% at different intervals, the interval between the areas having a wiring density of 100% becomes smaller toward the left so that areas having a wiring density of 100% in the vicinity are surrounding areas and a difference in the wiring density is small so as to suppress occurrence of Edge Over Erosion (EOE), and the interval between the areas having the wiring density of 100% becomes larger toward the right so that the areas having the wiring density of 100% in the vicinity are not included in the surrounding areas and the difference in the wiring density is large so as to accelerate the occurrence of the Edge Over Erosion (EOE).

* * * * *